Nov. 30, 1948.  J. F. SCHROEDER  2,454,947
WHEEL STARTER
Filed Nov. 16, 1944
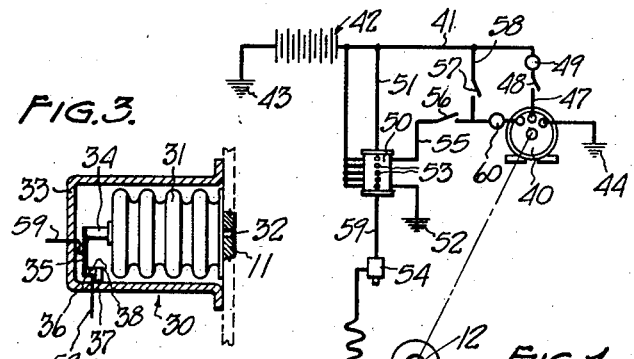
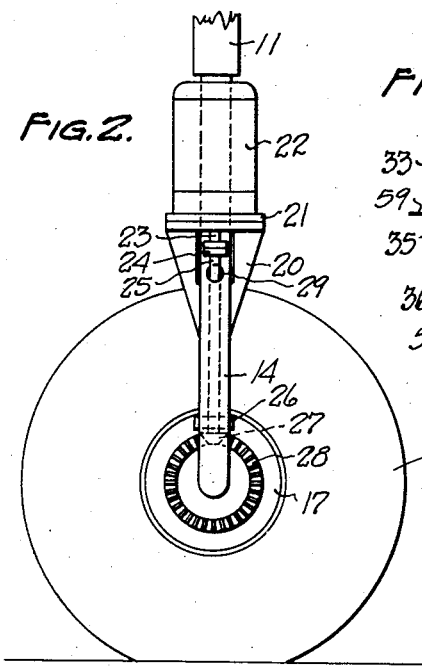
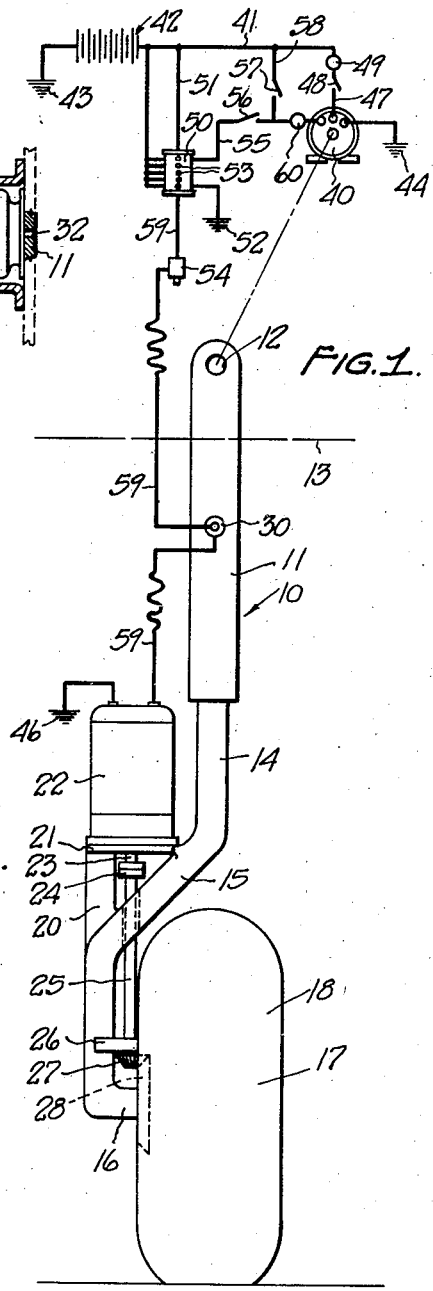
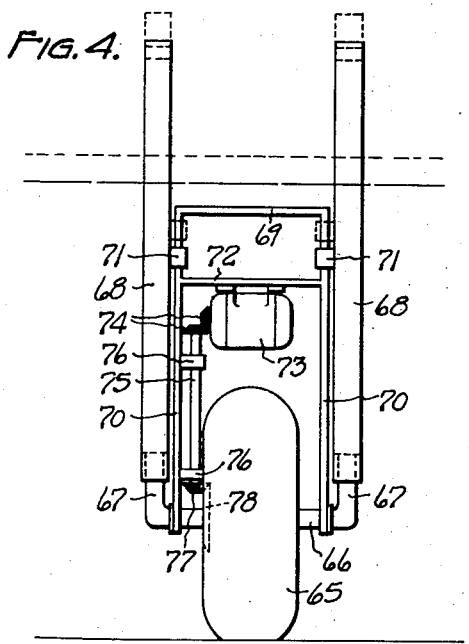
JOHN F. SCHROEDER,
INVENTOR.
BY Oltsch + Knoblock
ATTORNEYS.

Patented Nov. 30, 1948

2,454,947

UNITED STATES PATENT OFFICE 2,454,947

WHEEL STARTER

John F. Schroeder, South Bend, Ind.

Application November 16, 1944, Serial No. 563,650

13 Claims. (Cl. 244—103)

1

This invention relates to a wheel starter. More particularly it relates to a device for driving the wheels of an aircraft as it approaches a landing so that the wheels are rotating at predetermined speed at the time they strike the ground.

The tires of an aircraft are subject to great wear each time the craft lands because they sustain the full impact of the landing of the craft and because they experience a great frictional wear while being accelerated from a stationary position to a rotative speed commensurate with the ground speed of the craft. The last named condition results from the inertia of the wheels, and results in severe scuffing of the treads of the tires. The constant repetition of this scuffing soon wears the tread of the tire to a point where continued use of the tire is unsafe. The frictional wear will be reduced materially by causing the wheel to rotate at a peripheral speed commensurate with the landing speed of the craft, and the accomplishment of this result is the primary object of the invention.

A further object is to provide a device of this character for use with aircraft having retractable landing gear, which utilizes a wheel driving motor which is controlled so as to be energized only when the landing gear is shifted to extended position and until the craft lands.

A further object is to provide a drive motor for an aircraft wheel with means for deenergizing the motor when the wheel touches the ground.

A further object is to provide a device of this character having a wheel driving motor, manually operable means for controlling said motor, and means responsive to the position of the wheel and the loading of said wheel, respectively, for automatically and supplementally controlling said motor.

Other objects will be apparent from the description, drawing and appended claims.

In the drawing:

Fig. 1 is a front view of the device and the control circuit therefor.

Fig. 2 is a fragmentary side view of the device.

Fig. 3 is an enlarged longitudinal detail sectional view of one form of a pressure responsive switch which may be used in the device.

Fig. 4 is a front view of a modified embodiment of the invention, illustrated on a reduced scale.

Referring to the drawing, and particularly to Figs. 1 to 3 which illustrate one embodiment of the invention, the numeral 10 designates a landing strut or shock absorber of any conventional type which includes an elongated hydraulic cylinder 11. The strut is adapted to be pivoted at 12 at its upper end in a well or recess in an aircraft wing whose bottom surface is designated by line 13. The strut includes a shaft 14 longitudinally reciprocable in the cylinder incident to the application of stress to the strut and the release of stress therefrom, which shaft carries a piston and other mechanism (not shown) within the cylinder, as is well understood in the art pertaining to aircraft struts. The strut shaft 14 is preferably off-set at 15 intermediate its ends and its lower terminal portion 16 forms a stub axle on which is journaled an aircraft wheel 17 mounting a pneumatic tire 18.

A bracket 20 is secured or fixed to the strut shaft 14 at its off-set 15 and includes a platform or supporting panel 21 which fixedly mounts a variable speed electric motor 22. The shaft 23 of the motor extends through panel 21 and is connected by means of a shear coupling 24 with a shaft 25 aligned therewith and journaled in a bracket 26 carried by the lower end portion of the strut shaft 14. A bevel gear 27 is mounted on the lower end of shaft 25 and meshes with a beveled ring gear 28 mounted on the wheel 17. Motor shaft 23 extends freely through a passage 29 extending diagonally through the off-set portion 15 of strut shaft 14.

The strut 10 mounts a pressure responsive switch 30. One form which this switch may take is shown in Fig. 3 and comprises a bellows 31 which is secured at one end to the cylinder 11 and communicates therewith through an opening 32 in said cylinder. The bellows 31 is enclosed in a casing 33 of a size and shape to accommodate expansion of the bellows upon increase of pressure in the strut cylinder, as when the weight of the craft is supported by the strut. The free end of the bellows mounts a stud 34 from which a flexible leaf spring 35 projects laterally. Spring 35 mounts a switch contact 36. A lug 37 projects inwardly of casing 33 and mounts a contact 38 normally engaged by contact 36 when the bellows 31 is in normal position.

A reversible electric motor 40 serves as the means for shifting the strut 10 to and from its retracted and extended positions. The circuit to this motor and to motor 22 includes a main line 41 from a battery or other power source 42. The battery is grounded at 43, motor 40 is grounded at 44, and motor 22 is grounded at 46.

A lead 47 connects the terminal of motor 40 which controls motor rotation in wheel-retracting direction, with the line 41. Lead 47 has a manually controlled switch 48 and a limit switch 49 interposed therein.

A selector switch or relay 50 is connected with a lead 51 branching from line 41 and is grounded at 52. The selector switch is preferably of the solenoid or magnetic type and includes a plurality of push buttons 53 or like control elements for adjusting the same. Resistance means (not shown) are incorporated in the switch for selection or adjusted interposition in the circuit according to the particular button 53 selected. The switch also preferably includes means (not shown) for throwing it to open position when the circuit is deenergized. Switches or relays of this type are available commercially and are well understood by those skilled in the electrical art. A pair of leads 59 (of which only one is shown) branch from selector switch 50, and each has a limit switch 54 and pressure switch 30 interposed therein. The leads 59 are connected to the motors 22 of the respective struts 10. Limit switches 54 are adapted to be opened when the struts are in retracted position and they are biased to closing position. A lead 55 branches from and is controlled by selector switch 50 and is connected to the terminal of the reversible motor 40 which controls rotation of said motor to shift the landing gear to its operative extended position. A manual control switch 56 is interposed in lead 55. An emergency switch 57 may be provided, positioned remotely from switch 56, in a lead 58 in parallel to leads 51 and 55, for operating the motor 40 to extend or project the landing gear to operative position in the event of failure of switch 50 or associated parts.

The operation of the device is as follows: Assuming that the aircraft is at rest at a landing field whereby its weight is supported by the struts 10 and wheels 17, the pressure in the strut cylinders will act to open the pressure responsive switches 30 to deenergize the control circuit and thereby open the selector switch 50. Then, after a take-off, the switch 48 may be closed to cause motor 40 to operate to retract the landing gear.

When the craft approaches another landing, the pilot calculates the landing speed of the craft from wind velocity and other controlling factors, and actuates the button or other control element 53 of selector switch 50 which corresponds most nearly with this calculated ground speed. Then switch 56 is closed. At this time the limit switches 54 are opened, so the actuation of switches 50 and 56 serves initially only to operate the motor 40 to lower the landing gear. After the landing gear has been shifted from retracted position far enough to permit the wheels to be clear of the wells which received them while retracted, the limit switches 54 close. This closes the circuit to the wheel motors 22, inasmuch as pressure switches 30 are then in their normal closed positions. Thus, as the craft approaches a landing, the motors 22 start to rotate the wheels 17 and bring them to the speed selected by the setting of selector switch 50. When the tires 18 engage the ground, very little frictional wear occurs, because of the speed at which the wheels are rotated by motors 22. Therefore, long life of the tires is obtained, together with an increased safety factor due to reduction of the possibility that a tire will fail or blow out during landing due to weakening thereof incident to severe wear as now commonly experienced.

It will be noted that the motor drive for the wheels is automatically disconnected or rendered inoperative as soon as the wheels engage the ground by virtue of the opening of the pressure switches 30 responsive to the increased pressure in the cylinders of the struts 10. This breaks the circuits to motors 22 and opens the selector switch 50, it being understood that a suitable limit switch 60 in lead 55 has previously broken the circuit to motor 40 when the landing gear reached its operative extended position.

By the use of this type of control circuit, the various parts can be operated only in their proper sequence. Thus, in taking off, the motors 22 cannot be operated without operating the selector switch 50, which would be unlikely by virtue of its character. Also, the sequence of operation of motors 40 and 22 is automatic while the landing gear is being lowered by virtue of the automatic operation of limit switch 54. Likewise, the accidental operation of motors 22 while the craft is at rest is impossible because of the pressure-responsive switch 30.

The device is applicable to retractible landing gear of any type. Its application to landing gear of the type using two struts to support and cushion the shock of impact of a single wheel is illustrated in Fig. 4. In this construction, wheel 65 is journaled on the lower transverse portion 66 of a U-shaped shaft whose opposite end portions 67 are carried by and cooperate with the strut cylinders 68. A rigid frame 69 of inverted U-shape has its arms 70 supported at their ends on shaft portion 66 on opposite sides of the wheel 65. Guides 71 are carried by the strut cylinders to position the frame 69 and accommodate longitudinal shifting thereof with the shaft 66 relative to said strut cylinders. A plate or panel 72 extends transversely of frame 69 and serves to mount a motor 73. The motor has a geared or other driving connection 74 with a shaft 75 journaled in brackets 76 carried by frame 69. Shaft 75 mounts a bevel gear 77 which meshes with a ring gear 78 mounted on the wheel 65 in the same manner as in the embodiment first described. The operating means for controlling motor 73 will be of the same character as described above and will include the switch (not shown) responsive to pressure at the strut, as in the above described construction.

It will be understood that the gearing may be of any desired design, as skew bevel or hypoid, and will be enclosed in an oil-tight and weather-tight case or housing. Also, the wiring will be arranged to collapse or fold as the landing gear is retracted and extended.

I claim:

1. In combination, an aircraft strut including a cylinder and a shaft projecting longitudinally from and shiftably carried by said cylinder, an aircraft wheel carried by said shaft, a bracket carried by said shaft, a motor mounted on said bracket, and a driving connection between said motor and said wheel, said wheel being aligned with said strut cylinder and said strut shaft being laterally off-set and supporting said bracket at said off-set, said driving connection including a drive shaft connected to said motor by a sheer coupling and journaled in a bearing carried by said strut shaft, a gear pinion on said drive shaft, and a ring gear on said wheel in mesh with said pinion.

2. In combination, an aircraft strut including a cylinder and a shaft projecting longitudinally from and shiftably carried by said cylinder, an aircraft wheel journaled on said shaft, an electric motor, means supported by said shaft for mounting said motor, and a driving connection between said motor and said wheel, an electrical circuit controlling said motor, and a switch interposed in said circuit and responsive to the pressure in said cylinder to open said circuit when said wheel and strut are under load.

3. In combination, an aircraft strut including a cylinder and a shaft projecting longitudinally from and shiftably carried by said cylinder, an aircraft wheel journaled on said shaft, an electric motor, means supported by said shaft for mounting said motor, and a driving connection between said motor and said wheel, said motor being of the variable speed type, an electrical circuit controlling said motor, a speed selector in said circuit, and a normally closed switch in said circuit adapted to be opened in response to the pressure in said cylinder when said wheel engages the ground.

4. In an aircraft, a retractible landing gear including a strut and a wheel carried thereby, an electric circuit, a strut-positioning motor in said circuit, a drive motor in said circuit, means carried by said strut for mounting said drive motor in fixed relation to said wheel, a driving connection between said drive motor and wheel, and a normally closed limit switch in said circuit responsive to the position of said strut and opened to deenergize said drive motor when said landing gear is adjacent to its retracted position.

5. In an aircraft, a retractible landing gear including a strut and a wheel carried thereby, an electric circuit, a strut-positioning motor in said circuit, a drive motor in said circuit, means carried by said strut for mounting said drive motor in fixed relation to said wheel, a driving connection between said drive motor and wheel, and a normally closed drive-motor-controlling limit switch in said circuit responsive to the position of said strut and opened when said landing gear is adjacent to fully retracted position, and a normally closed switch in said circuit and adapted to open in response to the application of stress to said strut incident to landing.

6. In an aircraft, a retractible landing gear including a strut and a wheel carried thereby, an electric circuit, a strut-positioning motor in said circuit, a drive motor in said circuit, means carried by said strut for mounting said motor drive in fixed relation to said wheel, a driving connection between said motor drive and wheel, and a normally closed limit switch in said circuit responsive to the position of said strut and opened to deenergize said drive motor when said landing gear is adjacent to its retracted position, and a speed selector in said circuit for controlling said drive motor only.

7. In an aircraft, a retractible landing gear including a strut and a wheel carried thereby, a reversible motor controlling said landing gear, a variable speed motor carried by said strut and having a driving connection with said wheel, a motor control circuit, a pair of switches in said circuit for controlling the direction of rotation of said first motor, a speed selector in said circuit for controlling said variable speed motor, and means in said circuit for delaying operation of said wheel driving motor until said landing gear reaches a predetermined position in its lowering movement.

8. In an aircraft, a retractible landing gear including a strut and a wheel carried thereby, a reversible motor controlling the position of said landing gear, a variable speed motor carried by said strut and having a driving connection with said wheel, a motor control circuit, a speed selector in said circuit for controlling said wheel-driving motor, and a limit switch in said circuit for delaying the operation of said wheel-driving motor relative to operation of said reversible motor in gear-lowering direction.

9. In an aircraft, a retractible landing gear including a strut and a wheel carried thereby, a reversible motor controlling the position of said landing gear, a variable speed motor carried by said strut and having a driving connection with said wheel, a motor control circuit, a speed selector in said circuit for controlling said variable speed motor, and a pressure switch carried by and responsive to the pressure in said strut when under load for opening the circuit to said variable speed motor.

10. In an aircraft, a retractible landing gear including a strut and a wheel carried thereby, a reversible motor controlling the position of said landing gear, a variable speed motor carried by said strut and having a driving connection with said wheel, a motor control circuit, a speed selector in said circuit for controlling said wheel-driving motor, a limit switch in said circuit for delaying the operation of said wheel-driving motor relative to operation of said reversible motor in gear-lowering direction, and a pressure switch carried by and responsive to the pressure in said strut for opening the circuit to said variable speed motor.

11. In an aircraft, a retractible landing gear including a strut and a wheel carried thereby, a reversible motor controlling the position of said landing gear, a variable speed motor carried by said strut and having a driving connection with said wheel, a motor control circuit, a speed selector in said circuit for controlling said wheel-driving motor, and switch means for controlling the direction of rotation of said reversible motor, and means in said circuit responsive to the position of said gear for energizing said last named motor only in delayed response to operation of said switch means to operate said first motor in gear lowering direction.

12. In an aircraft, a retractible landing gear including a strut and a wheel carried thereby, a reversible motor controlling the position of said landing gear, a variable speed motor carried by said strut and having a driving connection with said wheel, a motor control circuit, a speed selector in said circuit for controlling said wheel-driving motor, said selector being normally open, and switch means for controlling the direction of rotation of said reversible motor, and means in said circuit responsive to the position of said gear for energizing said variable speed motor only in delayed response to actuation of said selector and predetermined operation of said switch means.

13. In an aircraft having a landing wheel, and a shock absorber between said wheel and said aircraft, the combination with means for moving said wheel from a retracted position to an extended position relative to said aircraft; of means controlled by said last mentioned means upon operation thereof for rotating said wheel, and means controlled by said shock absorber upon actuation thereof by said aircraft upon landing for rendering said wheel-rotating means ineffective.

JOHN F. SCHROEDER.

REFERENCES CITED

The following references are of record in the file of this patent:

UNITED STATES PATENTS

| Number | Name | Date |
|---|---|---|
| 1,021,338 | Rush | Mar. 26, 1912 |
| 2,065,146 | Morse | Dec. 22, 1936 |
| 2,115,701 | Baer | May 3, 1938 |
| 2,320,547 | Tiger | June 1, 1943 |
| 2,338,699 | Wilhoit | Jan. 11, 1944 |
| 2,347,847 | Schnell | May 2, 1944 |
| 2,347,986 | Bowerman | May 2, 1944 |
| 2,408,870 | Murdoch | Oct. 8, 1946 |

FOREIGN PATENTS

| Number | Country | Date |
|---|---|---|
| 847,546 | France | July 3, 1939 |